(12) United States Patent
Gwen

(10) Patent No.: US 12,434,985 B2
(45) Date of Patent: Oct. 7, 2025

(54) PROCESS AND SYSTEM FOR PRODUCING HYDROGENATED DRINKING WATER

(71) Applicant: CORE PACIFIC INC., Houston, TX (US)

(72) Inventor: Patrick Gwen, Houston, TX (US)

(*) Notice: Subject to any disclaimer, the term of this patent is extended or adjusted under 35 U.S.C. 154(b) by 399 days.

(21) Appl. No.: 18/163,480

(22) Filed: Feb. 2, 2023

(65) Prior Publication Data
US 2024/0262720 A1    Aug. 8, 2024

(51) Int. Cl.
| | |
|---|---|
| *B01D 61/02* | (2006.01) |
| *B01D 61/58* | (2006.01) |
| *C02F 1/44* | (2023.01) |
| *C02F 1/461* | (2023.01) |
| *B01D 61/46* | (2006.01) |
| *C02F 101/12* | (2006.01) |

(52) U.S. Cl.
CPC ............ *C02F 1/4618* (2013.01); *B01D 61/58* (2013.01); *C02F 1/441* (2013.01); *B01D 61/025* (2013.01); *B01D 61/461* (2022.08); *B01D 2313/18* (2013.01); *C02F 2101/12* (2013.01); *C02F 2201/005* (2013.01); *C02F 2201/46115* (2013.01); *C02F 2201/4616* (2013.01)

(58) Field of Classification Search
CPC . B01D 61/025; B01D 2311/26; C02F 1/4618; C02F 2201/46115
See application file for complete search history.

(56) References Cited

U.S. PATENT DOCUMENTS

| | | | |
|---|---|---|---|
| 5,593,554 A * | 1/1997 | Yamanaka | B01D 61/48 204/632 |
| 8,974,646 B2 | 3/2015 | Park | |
| 9,120,672 B2 | 9/2015 | Satoh | |
| 9,511,331 B2 | 12/2016 | Agarashi | |
| 10,421,673 B2 | 9/2019 | Lou | |
| 2003/0132104 A1 | 7/2003 | Yamashita | |
| 2005/0224996 A1 | 10/2005 | Yoshida | |
| 2016/0083856 A1 | 3/2016 | Iwatsu | |

FOREIGN PATENT DOCUMENTS

| | | | | |
|---|---|---|---|---|
| KR | 100590834 B1 * | 6/2006 | | C02F 1/4618 |
| KR | 20190023589 A * | 3/2019 | | B01D 35/06 |

OTHER PUBLICATIONS

Han C.S et al—KR 100590834 B1 FIT merged translation (Year: 2006).*
Cho N.S et al—KR 20190023589 A FIT merged translation (Year: 2019).*

* cited by examiner

*Primary Examiner* — Bradley R Spies
(74) *Attorney, Agent, or Firm* — Egbert, McDaniel & Swartz, PLLC

(57) ABSTRACT

A process and system for producing a hydrogenated drinking water has a reverse osmosis filter, an ionizer and a power supply. The reverse osmosis filter has an inlet on one side thereof and first and second outlets on an opposite side thereof. The first outlet is adapted to pass a permeate from the reverse osmosis filter. The second outlet is adapted to pass brine from the reverse osmosis filter. The ionizer is in fluid communication with the reverse osmosis filter. The ionizer has a first inlet connected to the first outlet of the progress osmosis filter. The ionizer has a second inlet connected to the second outlet of the reverse osmosis filter. The power supply is connected to the ionizer so as to electrolysize the brine and the permeate.

10 Claims, 2 Drawing Sheets

PROCESS AND SYSTEM FOR PRODUCING HYDROGENATED DRINKING WATER

FIELD OF THE INVENTION

The present invention relates to the filtering of drinking water. More particularly, the present invention relates to the removal of impurities from drinking water. More particularly, the present invention relates to producing hydrogenated drinking water from tap water.

DESCRIPTION OF RELATED ART

Hydrogen water is ordinary drinking water enriched with gaseous molecular hydrogen. Hydrogen water is tasteless and odorless. Hydrogen molecules in such water are, in no way, associated with water molecules. In other words, it contains hydrogen in its pure $H_2$ form. Therefore, the water formula does not change. Hydrogen water has pronounced therapeutic and wellness properties confirmed by numerous scientific studies on humans and animals. Today, more than 1500 studies worldwide, including the USA, Japan Korea, China, Serbia, Mexico, Germany and Slovakia, have been published on molecular hydrogen therapy and the study of hydrogen water effects on the human body.

In simple terms, aeration is saturated with $CO_2$ gas. In the production of hydrogen water, it is saturated with $H_2$ (hydrogen gas). Moreover, chemically, hydrogen is absolutely inert, i.e. it does not react or enter at high temperature or pressure. The hydrogen molecule has a high chemical potential, i.e. an effect on the biological and biochemical processes in the human body.

Today, according to research of the Molecular Hydrogen Institute, the most and influential international organization that deals with the therapeutic properties of hydrogen, more than 30% of the population of Japan and more than 20% of the South Korean population regularly use hydrogen water produced by a water machine.

The characteristics of hydrogen water include ORP (redox potential), pH, and the concentration of molecular hydrogen as measured in PPB/PPM. The negative oxidation-reduction potential (ORP) of hydrogen water can vary from 150 to 600 m V depending on how the process of saturation proceeds, the quality of water, its type, saltiness, etc. The pH value of hydrogen water, obtained using electrolysis technology and direct saturation (i.e. saturation with $H_2$), corresponds to the pH of the water that has been saturated. When receiving hydrogen water by direct electrolysis, the pH becomes slightly alkaline. The molecular hydrogen has extremely low water solubility. However, even under such conditions, its amount in water is sufficient for biochemical reactions. At normal atmospheric pressure, a maximum of 1.8 milliliters of hydrogen dissolves in approximately 1000 milliliters of water. This corresponds to approximately 1.8 parts per million.

In many scientific studies, molecular hydrogen exhibits anti-oxidant-like effects and properties. As of today, only three ways of antioxidant effect of molecular hydrogen have been studied. First, there is the inhibition of reactive oxygen species increase (free radicals). Hydrogen is able to inhibit and suppress the hydroxyl radical (OH) in human cells. Several pathways of molecular hydrogen exposure in the human body are already known with certainty. Secondly, the inhibition of reactive nitrogen species increased. The molecular hydrogen inhibits the formation of $NO_2$ which, in turn, suppresses the formation of ONOO— (peroxynitrite), which reduces oxidative stress. Thirdly, hydrogen water increases the regulation of powerful endogenous antioxidants. Human cells have their own natural defense system and produce the human body's own antioxidants, such as superoxide dismutase, catalase, and glutathione peroxidase. Hydrogen enhances the endogenous antioxidants by activating the Nrf2 keap1 system through the properties of hydrogen signal modulations.

Hydrogen water also has an anti-inflammatory effect. Hydrogen has a profound effect on the immune system and inflammatory process in the human body. This is accomplished by reducing oxidative stress, lowering inflammatory cytokine levels, and increasing the important anti-inflammatory cytokine level, in the prevention of inflammation. Hydrogen has a unique ability to penetrate cells and even tiny structures inside cells (organelles), such as mitochondria and the nucleus. No other molecules can penetrate deep into the cells. Hydrogen water achieves various paths. These include inflammatory cytokines reduction (TNF-alpha and gamma, IL-6, IL-1 beta, IL-10, IL-12, NF-κB), cancer-causing genes decrease (decrease in caspase 3, caspace 12, caspace 8, Bcl-2, BAX), increased activity of genes associated with cancer (bFGF, HGF, IFNγ), reduced activity of genes associated with inflammation (i-NOS, VEGF, CCL2, ICAM1, PGE 2), energy metabolism increase (increased FGF21), increased ghretin, and detox genes activation (Nrf2 and heme-oxygenase-1).

A typical method of producing hydrogen-rich water occurs by electrolyzing water and dissolving the hydrogen gas in the water in order to produce the hydrogen-rich water. FIG. 1 illustrates such a system. Initially water 10 is directed to a prefilter 12. Water 10 can be in the nature of tap water. The prefilter 12 can be a screen, or other type of mechanical filter, that effectively separates large particulates from the remaining water. The pretreatment filter also can be an activated carbon filter, such as activated carbon filter 14. In FIG. 1, the prefiltered water passes from the pre-filter 12 into the activated carbon filter 14. The activated carbon filter 14 filters in a bed of activated carbon. The activated carbon filter 14 removes impurities through adsorption. It removes some chlorines particles (such as sediment) and some volatile organic compounds. The activated carbon filter 14 does not effectively filter inorganics, fluorides, or cyanide. The prefiltered water will pass through a line 16 into the activated carbon filter 14. The filtrate from the activated carbon filter 14 will pass along line 18 to an ionizer 20. Ionizer 20 is part of an electrolysis unit. This water is delivered to the ionizer. The ionizer will produce an output of hydrogen 22 and an output of oxygen 24. The output will be approximately 50% hydrogen and approximately 50% oxygen.

The hydrogen water that is produced for the as the hydrogen output 22 will be very effective for use as a hydrogenated drinking water. However, the oxygenated water 24 would be simply discarded since it contains undesirable oxygen therein.

One of the problems associated with the prior art system shown in FIG. 1 is that a large number of suspended solids and impurities will pass from the activated carbon filter 14 into the ionizer 20. These dissolved solids can include minerals, salts, metals, cations or ions. They can also include inorganic salts, calcium, magnesium, potassium, sodium, bicarbonates, chlorides and sulfites. Ultimately, these total dissolved solids can flow to the ionizer 20. As such, it is desirable to remove such dissolved solids from the products produced from the ionizer 20.

Reverse osmosis filters have not been used, in the past, for the production of hydrogen water. The reason is that the reverse osmosis filter passes a very small percentage of the permeate from the original water. The remainder of the contaminant-containing water passes outwardly of the reverse osmosis filter as brine. If the completely filtered total dissolved solids-free water passes into the ionizer, then the ionizer becomes very ineffective at separating the hydrogen and oxygen components. The ions associated with the total dissolved solids are important in the electrolysizing of the water. As such, in the past, it was necessary to avoid the reverse osmosis filter since the ionizer would become relatively ineffective. It was necessary to avoid the reverse osmosis filter in order to enhance the performance of the ionizer. Additionally, in the prior art, there is a substantial amount of waste water since approximately 50% of the water from the ionizer must be removed since it contains the impurities and salts. In areas where water supply is scarce, this waste water would be unacceptable.

In the past, various patents and patent application publications have issued with respect to the hydrogenation of drinking water. For example, U.S. Pat. No. 8,974,646, issued on Mar. 10, 2015 to Park et al., describes a portable hydrogen-rich water generator. This hydrogen-rich water generator includes a separable drinking cup, an electrolytic cell which includes an anode, a cathode, and a solid polymer electrolyte membrane and is disposed at the bottom of the drinking cup. A reservoir base allows the drinking cup to be mounted thereto. An anode reaction of the electrolytic cell is generated in the reservoir base. A float valve allows the water to be continuously supplied of a certain water level from a water tank. A power supply applies direct current power to the electrolytic cell. When power is applied after putting purified water into the drinking cup and mounting the drinking cup on the reservoir base, the electrolytic cell electrolysizes the water in the reservoir base so that oxygen is generated at the anode of the reservoir base side and hydrogen is generated at the cathode of the drinking cup side. This allows hydrogen gas is to be dissolved in the purified water in the drinking cup within a short time. As such a hydrogen-rich water is produced.

U.S. Pat. No. 9,120,672, issued on Sep. 1, 2015 to Satoh et al., describes a hydrogen-containing fluid obtained through storing a hydrogen generating system which contains a hydrogen generating agent within a hydrogen bubble forming implement. The hydrogen bubble forming implement has a gas/liquid separating section including a gas-permeable film or an open-close type valve so as to cause the hydrogen generating system and a general purpose water to react in the hydrogen bubble forming implement. A hydrogen gas is generated in the hydrogen bubble forming implement.

U.S. Pat. No. 9,511,331, issued in Dec. 6, 2016 to J. Agarashi, discloses a process for continuously producing hydrogen-containing water for drinking. This process includes the steps (a) filtering and purifying water as a raw material; (b) degassing the purified water supplied to a degasser; (c) dissolving hydrogen gas in the degassed water supplied to a hydrogen dissolution device; (4) sterilizing the hydrogen-dissolved water supplied to a sterilizer, (e) filling the hydrogen-containing water supplied to a filling device in a sealed container and transferring the filled water product to a heat sterilizer; and (f) heat-sterilizing the water product supplied to the heat sterilizer. A portion of the hydrogen-containing water is returned to the degasser.

U.S. Pat. No. 10,421,673, issued on Sep. 24, 2019 to Luo et al., teaches a simple and efficient electrolysis device for making electrolyzer water from pure water. This device comprises a controllable electrolysis power supply, and an electrolytic electrode power plate. The component is immersed within the to-be-electrolyzer water when in operation. A gap is provided between an anode and a cathode of the electrolytic electrode plate assembly. This electrolysis device is used for making electrolysized water from pure water.

U.S. Patent Application Publication No. 2003/0132104, published on Jul. 17, 2003 to Yamashita et al., provides a hydrogen-dissolved water production apparatus. A degassing device, a hydrogen dissolving device, and a palladium catalyst column are provided in that order downstream of a high-purity water production device. An impurity removal device is connected to the exit side of treated water of the palladium catalyst column. The impurity removal device removes impurity ions which are eluted into the water to be treated for impurity particles which mix in with the water to be treated during the treatment in the palladium catalyst column. The impurity removal device comprises an ion exchange device and a membrane treatment device, such as in ultrafiltration membrane device, a reverse osmosis membrane device, or the like.

U.S. Patent Application Publication No. 2005/0224996, published on Oct. 13, 2005 to Y. Yoshida, shows a hydrogen-reduced water and method for preparing such hydrogen-reduced water. A pressure vessel is filled with hydrogen gas. The pressure of the hydrogen gas in the pressure vessel is maintained within a predetermined range. Raw water is introduced into the pressure vessel. The raw water is introduced into the pressure vessel as a shower from a nozzle provided at the upper interior of the pressure vessel. After contacting hydrogen gas with the raw water in the pressure vessel and dissolving the hydrogen gas in the raw water, the water is packaged and sealed in a highly airtight container.

U.S. Patent Application Publication No. 2016/0083856, published a Mar. 24, 2016 to Iwatsu et al., shows an electrolytic treatment using treatment subject ions contained in a treatment liquid. The method includes an ion positioning step for positioning a direct electrode and a counter electrode so as to sandwich the treatment liquid and positioning an indirect electrode for forming an electric field in the treatment liquid. A treatment subject ion migration step applies a voltage to the indirect electrode and thereby moves the treatment subject ions in the treatment liquid to the counter electrode side. A treatment subject ion redox step applies a voltage between the direct electrode and the counter electrode so as to oxidize or reduce the treatment subject ions that has migrated to the counter electrode side.

It is an object of the present invention to provide a process and system for producing hydrogenated drinking water which has a relatively small footprint.

It is another object of the present invention to provide a process and system for producing hydrogenated drinking water which assures that the hydrogenated drinking water is uncontaminated.

It is another object of the present invention to provide a process and system for producing hydrogenated drinking water that has mechanical and pneumatic barriers to contamination.

It is another object of the present invention to provide a process and system for producing hydrogenated drinking water that requires a minimal amount of electricity.

It is another object of the present invention provide a process and system for producing hydrogenated drinking water which requires less water consumption.

It is another object of the present invention to provide a process and system for producing hydrogenated drinking water which produces a pure hydrogenated water output.

It is another object of the present invention to provide a process and system for producing hydrogenated drinking water which quickly hydrogenates the water.

It is another object of the present invention to provide a process and system for producing hydrogenated drinking water which provides the ability to use reverse osmosis filtration and to achieve the benefits of reverse osmosis filtration.

It is another object of the present invention to provide a process and system for producing hydrogenated drinking water which guarantees that no contaminants remain in the hydrogenated water.

It is a further object of the present invention to provide a process and system for producing hydrogenated drinking water which improves the health and well-being of a person drinking the hydrogenated water.

It is still another object of the present invention to provide a process and system for producing a hydrogenated drinking water that utilizes salts and ions from the brine of a reverse osmosis filter to improve the operation of the ionizer.

These and other objects and advantages of the present invention will become apparent from a reading of the attached specification and appended claims.

BRIEF SUMMARY OF THE INVENTION

The present invention is a process for producing hydrogenated drinking water. This process includes the steps of: (1) passing water into a reverse osmosis filter so as to produce a permeate and a brine; (2) passing the permeate from the reverse osmosis filter to an ionizer; (3) passing at least a portion of the brine from the reverse osmosis filter to the ionizer; and (4) ionizing the permeate and the at least a portion of the brine so as to produce an oxygenated water output and the hydrogenated drinking water output.

In the present invention, the ionizer has a first compartment and a second compartment. The step of passing the permeate includes passing the permeate into the first compartment and the second compartment. The step of passing at least a portion of the brine includes passing the at least a portion of the brine into only the second compartment. The permeate and the at least a portion of the brine are mixed together in the second compartment.

The ionizer has a first conductor in the first compartment and a second conductor in the second compartment. The first conductor passes a negative charge. The second conductor passes a positive charge. The step of ionizing includes applying the positive charge to the second conductor and the negative charge to the first conductor so as to ionize the permeate in the first compartment and the brine in the second compartment such that hydrogen molecules migrate from the second compartment to the first compartment. The ionizer has a membrane positioned between the first compartment and the second compartment. The hydrogen molecules migrate from the second compartment through the membrane into the first compartment. The membrane blocks oxygen molecules from entering the first compartment. The permeate flows under a first pressure from the reverse osmosis filter to the first and second compartments. The at least a portion of the brine flows under a second pressure to the second compartment. The first pressure is greater than the second pressure.

The step of passing at least a portion of the brine includes discharging the brine from the reverse osmosis filter along a line toward an outlet. The line has a valve thereon. The valve is moved so as to direct the at least a portion of the brine for the ionizer and directs a remaining portion of the brine toward a drain.

The present invention is also a system for producing a hydrogenated drinking water. The system comprises a reverse osmosis filter, an ionizer, and a power supply. The reverse osmosis filter has an inlet on one side thereof and first and second outlets on an opposite side thereof. The first outlet is adapted to pass a permeate from the reverse osmosis filter. The second outlet is adapted to pass a brine from the reverse osmosis filter. The ionizer is in fluid communication with the reverse osmosis filter. The ionizer has a first line connected to the first outlet of the reverse osmosis filter. The ionizer has a second inlet connected to the second outlet of the reverse osmosis filter. The power supply is connected to the ionizer so as to electrolysize the brine and the permeate in the ionizer. The ionizer has a first outlet adapted to pass an electrolysized hydrogenated drinking water from the ionizer and a second outlet adapted to pass an oxygenated water from the ionizer. The power supply provides a positive current and a negative current to the brine and to the permeate, respectively.

The second outlet has a valve thereon. The valve is movable so as to pass at least a portion of the brine from the reverse osmosis filter to the ionizer.

The ionizer has a third inlet. The third inlet is in communication with the first outlet of the reverse osmosis filter such that a portion of the permeate enters the first inlet and another portion of the permeate enters the third inlet. The ionizer has a first outlet adapted to pass the hydrogenated drinking water from the ionizer and a second outlet adapted to pass the oxygenated water from the ionizer.

The ionizer as used in the system of the present invention comprises a container having an interior volume, a first compartment positioned within the interior volume of the container, a second compartment positioned within the interior compartment of the container, and a membrane positioned between the first compartment and the second compartment. A first conductor is positioned in the first compartment and a second conductor is positioned in the second compartment. The first inlet communicates with the first compartment such that permeate from the reverse osmosis filter flows into the first compartment. The second inlet communicates with the second compartment such that the brine flows into the second compartment. The ionizer has a third inlet. This third inlet is communication with the first outlet of the reverse osmosis filter. The third inlet is in communication with the second compartment such that a portion of the permeate flows into the second compartment. As used therein, the third inlet can be a line connected to the second inlet such that the portion of the permeate flows into the second compartment (along with the brine).

The first conductor conducts a negative charge from the power supply. The second conductor conducts a positive charge from the power supply such that the hydrogen molecules migrate through the membrane from the second compartment to the first compartment. The membrane is a proton exchange membrane. The first compartment has a hydrogenated water outlet. The second compartment has an oxygenated water outlet.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
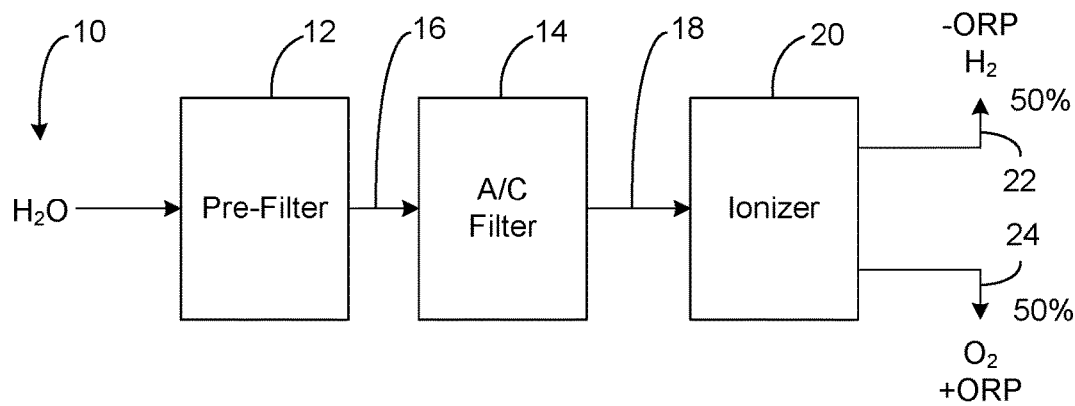
FIG. 1 is a block diagram showing the operation of a system for producing hydrogenated water in accordance with the prior art.
Figure 2:
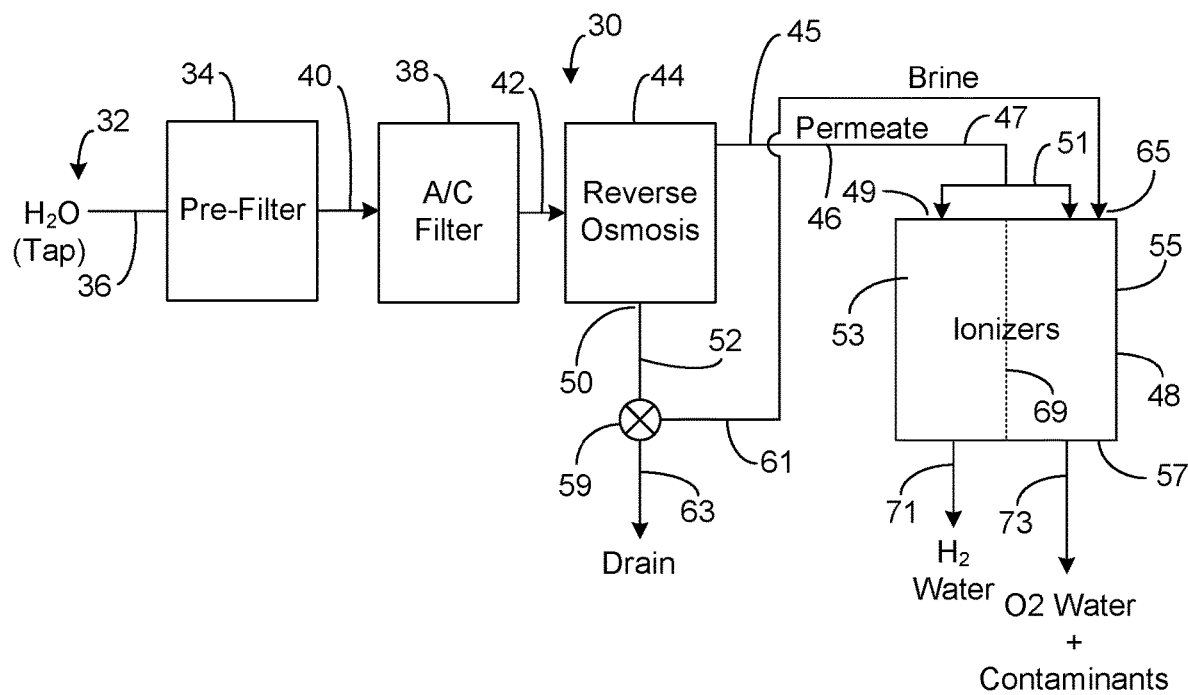
FIG. 2 is a block diagram showing the process and system of the present invention for producing a hydrogenated drinking water output.

Referring to FIG. 2, there shown the system 30 for the production of a hydrogenated water in accordance with the preferred embodiment of the present invention. System 30 includes a water supply 32. Water supply 32 can be in the nature of a tap water supply. A pre-filter 34 is connected to the water supply 32 by a line 36. Pretreatment filter 34 can be in the nature of an activated carbon filter, a screen, a sand filter, or other device wherein particulate impurities in the water supplied from the water supply 32 are separated from the flow passing from the prefilter 34 into the activated carbon filter 38. This water will pass along line 40 into the activated carbon filter 38. The activated carbon filter 38 has a bed of activated carbon. This activated carbon filter 38 serves to remove impurities through adsorption. It removes some chlorines, particulates such a sediment, and volatile organic compounds. It does not effectively filter inorganics, fluoride, cyanide. The water passing through line 42 to reverse osmosis filter 44 will contain a certain amount of total dissolved solids (TDS). These total dissolved solids can include minerals, salts, metals, cations or anions. It also can include inorganic salts, calcium, magnesium, potassium, sodium, bicarbonates, chlorides and sulfites. Typically, a pump will be provided along line 42 or in cooperation with line 42 so as to apply a pressure of approximately 80 p.s.i. to the flow to the reverse osmosis filter 44.

The reverse osmosis filter 44 completely filters the impurities from the water. In particular, the reverse osmosis filter 44 will remove inorganics and fluorides. Generally, only the pure water molecules will get through and pass as permeate 46. The permeate 46 passes to an ionizer 48. Since the permeate 46 is pure water, it is too clean for the ionizer. There are no ions, minerals or salts for proper charging by the ionizer 48. The absence of such total dissolved solids from the permeate 46 will significantly reduce conductivity within the ionizer 48.

As can be seen in FIG. 2, the permeate 46 passes outwardly of the reverse osmosis filter 44 through a first outlet 45 into line 47. Ultimately, line 47 will divide into a first portion 49 and a second portion 51 so as to deliver the permeate 46 into a first compartment 53 and a second compartment 55 of ionizer 48. Specifically, portion 49 of line 47 will deliver some of the permeate into the first compartment 53. The portion 51 of line 47 will deliver this permeate into the ionizer 55. The ionizer 47 is shown in greater detail in connection with FIG. 3 herein.

Importantly, the permeate 46 exiting outlet 45 from reverse osmosis filter 44 is essentially pure water containing no contaminants, salts, or other dissolved solids. As such, it will contain virtually no ions with which to electrolysize the solution within the compartment 57 of ionizer 48. Any attempt to electrolysize such ions within the ionizer 48 would be extremely ineffective in achieving a proper hydrogenated drinking water output. As such, in order to allow the electrolysis process to be conducted properly within ionizer 48, it is necessary to introduce the salts and ions into the ionizer. In the present invention, this is achieved by introducing at least a portion of the brine 42 from outlet 50 of the reverse osmosis filter 44.

In FIG. 2, it can be seen that the permeate 52 is delivered along a line to a valve 59. Valve 59 is a three-way valve that can be moved into a position so that a portion of the brine 52 passes into line 61 and another portion of the brine 52 flows to outlet 63. Outlet 63 will assure that the unused portion of the highly contaminated and salty brine is delivered to a drain for disposal. The remaining portion of the highly salted and contaminated brine 52 will flow along line 61 so as to be discharged into a second inlet 65 into the second compartment 55 of ionizer 48. As such, the highly salted and contaminated brine 52 can mix with the permeate 46 within the compartment 55 of the ionizer 48. The result is that the very pure permeate will only reside in the first compartment 53. The mixture of the very pure permeate and the highly salted and contaminated brine 52 will reside in the second compartment 55. As such, the second compartment 55 will contain the necessary ions so as to effect the electrolysis process.

A membrane 69 is positioned between the first compartment 53 and the second compartment 55. The membrane 69 is a proton exchange membrane, such as that manufactured by DuPont under the trademark "NAFION"™. This proton exchange membrane 69 assures that only hydrogen molecules migrate through the membrane 69 from the second compartment 55 into the first compartment 53 during the electrolysis process. As such, membrane 69 provides a "mechanical" barrier against the migration of oxygen and contaminants from the second compartment 55 into the first compartment 53.

Additionally, and furthermore, the permeate 46 will flow through line 47 and into the first compartment 53 and the second compartment 55 under a significant amount of pressure. In contrast, the brine 52 will flow through line 61 into inlet 65 and into the second compartment 55 under much less pressure. Since the fluid pressure within the first compartment 53 is greater than the fluid pressure within the second compartment 55, this pressure differential will resist any flow from the second compartment 55 into the first compartment 53. Once again, this assures that contamination of the water within the first compartment 53 is avoided since this presents a pneumatic barrier to the fluid flow from the second compartment 55 to the first compartment 53. As such, the present invention absolutely assures that the hydrogenated drinking water from the first compartment 53 is free of contamination.

The ionizer 48 includes a first outlet 71 and a second outlet 73. The first outlet 71 passes the hydrogenated drinking water from the first compartment 53. The second outlet 73 passes the oxygenated water (along with its contaminants) outwardly of the second compartment 55. The oxygenated water and the contaminants can be disposed of in any desired manner.

The process and system of the present invention, as shown in FIG. 2, achieve significant advantages over the prior art. First, the present invention allows the use of reverse osmosis for the filtering of the tap water 32. As such, the reverse osmosis filter 44 effectively removes all of the contaminants and total dissolved solids from the tap water. This extremely pure water will pass as a pure permeate 46 to the first compartment 53 and the second apartment 55 of the ionizer 48. As such, it is assured that very pure water will reside in the first compartment 53.

It is important for the present invention to avoid the waste of water and avoid the addition of expensive minerals and other substances for the purposes of enhancing the electrolytic reaction within the ionizer 48. As such, the present invention passes the highly salted and contaminated brine 52 from the reverse osmosis filter 44 into the second compartment 55 of the ionizer 48. The membrane 69 assures that the highly salted and contaminated brine 42 will not migrate into the pure water within the first compartment 53. Additionally, the pressure differential between the pure water in first compartment 53 and the contaminated water in second compartment 55 will assure (by hydraulic means) that there is no flow of contaminated water from the second compartment 55 into the first compartment 53. Since the brine from the reverse osmosis process is utilized in the present invention, there is no need to add minerals so as to effect the electrolysis process. The minerals are contained in the tap water that is originally filtered by the reverse osmosis filter 44. Additionally, since the brine 52 it is highly salted, this will assure that the electrolysis process is carried out very quickly and with a minimal amount of electricity. Ultimately, after the electrolysis process is carried out, the highly contaminated and highly salted oxygenated water can be properly disposed. Unlike the prior art, approximately 75% of the water is preserved in the process of the present invention in comparison with the 50% of water in the prior art. Since the brine is highly concentrated with salts, the footprint of the ionizer can be very small for the carrying out of the hydrogenation of the drinking water.

Figure 3:
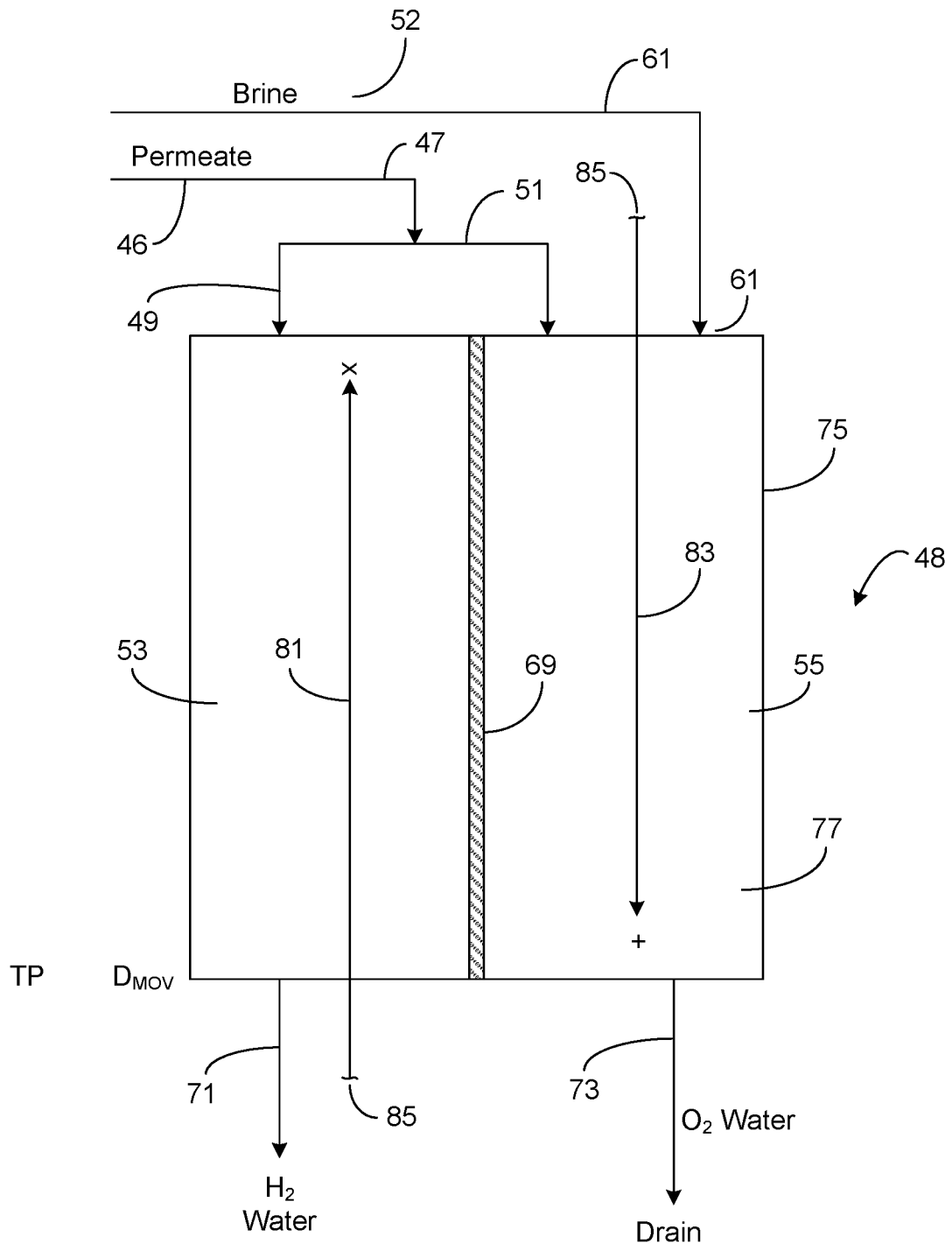
FIG. 3 is a cross-sectional view showing the configuration of the ionizer of the present invention.

The ionizer 48 is particularly shown in FIG. 3. Ionizer 48 includes a container 75 having an interior volume 77. The membrane 69 is positioned between the first compartment 53 and the second compartment 55. In particular, it can be seen that the permeate 46 will pass along line 47 into portions 49 and 51 into the first compartment 53 in the second compartment 55. This permeate is highly purified water with minimal salts. The brine, on the other hand, passes along line 61 into the inlet 65 of the second compartment 55. As such, the second compartment 55 will contain both the highly pure permeate and the highly salted and contaminated brine 52.

FIG. 3 shows that there is a first conductor 81 positioned in the first compartment 53 and a second conductor 83 positioned in the second compartment 55. The first conductor 51 will pass a negative charge from power supply 85 into the first compartment 53. The second conductor 83 will pass a positive charge from power supply 85 into the second compartment 55. The charging of the first conductor 81 and second conductor 83 will charge the salts within the brine 52 within the second compartment 55 so as to cause the hydrogen molecules to migrate toward and through the membrane 69 into the first compartment 53. Ultimately, in order to create the necessary electrical conductivity between the fluids in the first compartment 53 and second compartment 55, the surfaces of the membrane 69 will need to be soaked with the respective fluids. Since the membrane 69 is a proton exchange membrane, only hydrogen molecules can migrate from the highly salted and contaminated water within the second compartment 55 to the first compartment 53. As such, only hydrogen molecules will bubble through and dissolve in the water in the first compartment 53. Ultimately, this hydrogenated drinking water can be discharged through outlet 71 for consumption by a user. The residual oxygenated water will pass through outlet 73 for disposal.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents

The invention claimed is:

1. A process for producing hydrogenated drinking water, the process comprising:
   passing water into a reverse osmosis filter so as to produce a permeate and a brine;
   passing the permeate from the reverse osmosis filter to an ionizer;
   passing at least a portion of the brine from the reverse osmosis filter to the ionizer; and
   ionizing the permeate and the at least a portion of the brine so as to produce an oxygenated water output and a hydrogenated drinking water output.

2. The process of claim 1, the ionizer having a first compartment and a second compartment, the step of passing the permeate comprising:
   passing the permeate into the first compartment and to the second compartment.

3. The process of claim 2, the step of passing at least a portion of the brine comprising:
   passing the at least a portion of the brine into only the second compartment.

4. The process of claim 3, further comprising:
   mixing the permeate and the at least a portion of the brine in the second compartment.

5. The process of claim 2, wherein the ionizer has a first conductor in the first compartment and a second conductor in the second compartment, the first conductor passing a negative charge, the second conductor passing a positive charge.

6. The process of claim 5, the step of ionizing comprising:
   applying the positive charge to the second conductor and the negative charge to the first conductor so as to ionize the permeate in the first compartment and the at least a portion of the brine in the second compartment such that hydrogen molecules migrate from the second compartment to the first compartment.

7. The process of claim 6, wherein the ionizer has a membrane positioned between the first compartment and the second compartment.

8. The process of claim 7, wherein the step of ionizing further comprises:
   migrating the hydrogen molecules from the second compartment through the membrane and into the first compartment while blocking oxygen molecules from entering the first compartment.

9. The process of claim 2, wherein the permeate flows under a first pressure from the reverse osmosis filter to the first and second compartments, the at least a portion of the brine flowing under a second pressure to the second compartment of the ionizer, wherein the first pressure is greater than the second pressure.

10. The process of claim 1, the step of passing at least a portion of the brine comprising:
    discharging the brine from the reverse osmosis filter along a line toward an outlet, the line having a valve thereon; and moving the valve so as to direct the at least a portion of the brine toward the ionizer and so as to direct the remaining portion of the brine toward a drain.

* * * * *